(12) United States Patent
Malina et al.

(10) Patent No.: US 11,688,420 B2
(45) Date of Patent: Jun. 27, 2023

(54) HYBRID DEDICATED AND DYNAMIC SERVO FOR TAPE

(71) Applicant: Western Digital Technologies, Inc., San Jose, CA (US)

(72) Inventors: James N. Malina, Irvine, CA (US); Masahito Kobayashi, Fujisawa (JP); Derrick E. Burton, Ladera Ranch, CA (US); Robert G. Biskeborn, Hollister, CA (US); Mark L. Watson, Boulder, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/522,646

(22) Filed: Nov. 9, 2021

(65) Prior Publication Data
US 2023/0141431 A1 May 11, 2023

(51) Int. Cl.
*G11B 5/008* (2006.01)
*G11B 21/00* (2006.01)

(52) U.S. Cl.
CPC ............ *G11B 5/008* (2013.01); *G11B 21/003* (2013.01)

(58) Field of Classification Search
None
See application file for complete search history.

(56) References Cited

U.S. PATENT DOCUMENTS

| | | | |
|---|---|---|---|
| 6,934,108 B2 | 8/2005 | Harper et al. | |
| 8,941,940 B1 | 1/2015 | Bayang et al. | |
| 9,026,728 B1 | 5/2015 | Xi et al. | |
| 10,699,745 B1 | 6/2020 | Ide et al. | |
| 10,748,568 B1 | 8/2020 | Chahwan et al. | |
| 2007/0070870 A1 | 3/2007 | Rothermel | |
| 2014/0204483 A1* | 7/2014 | Cherubini et al. | G11B 5/008 360/78.02 |

* cited by examiner

*Primary Examiner* — Craig A. Renner
(74) *Attorney, Agent, or Firm* — Patterson + Sheridan, LLP; Steven H. VerSteeg

(57) ABSTRACT

The present disclosure generally relates to a tape head and a tape drive including a tape head. The tape head comprises servo heads configured to read servo data from a tape, a plurality of write heads configured to: write user data to a plurality of data tracks of the tape and write embedded servo data into one or more data fields of the tape, the embedded servo data comprising servo positioning information, and a plurality of read heads configured to read the user data and the embedded servo data from the tape. The embedded servo data may be embedded servo fields or embedded servo tracks. The embedded servo data allows the tape head to be accurately controlled and positioned above the tape, and for new data to be accurately appended to the tape.

19 Claims, 8 Drawing Sheets

HYBRID DEDICATED AND DYNAMIC SERVO FOR TAPE

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape head capable of accurate positioning over a tape dynamically.

SUMMARY OF THE DISCLOSURE

The present disclosure generally relates to a tape head and a tape drive including a tape head. The tape head comprises servo heads configured to read servo data from a tape, a plurality of write heads configured to: write user data to a plurality of data tracks of the tape and write embedded servo data into one or more data fields of the tape, the embedded servo data comprising servo positioning information, and a plurality of read heads configured to read the user data and the embedded servo data from the tape. The embedded servo data may be embedded servo fields or embedded servo tracks. The embedded servo data allows the tape head to be accurately controlled and positioned above the tape, and for new data to be accurately appended to the tape.

In one embodiment, a tape head assembly comprises one or more servo heads configured to read servo data from one or more dedicated servo tracks of a tape, a plurality of write heads configured to: write user data to a plurality of data tracks of the tape and write one or more embedded servo fields into one or more data fields of the plurality of data tracks of the tape, the one or more embedded servo fields comprising servo positioning information, and a plurality of read heads configured to read the user data and the embedded servo fields from the tape.

In another embodiment, a tape head assembly comprises one or more servo heads configured to read servo data from one or more dedicated servo tracks of a tape, a plurality of write heads configured to: write user data to a plurality of data tracks of the tape and write one or more embedded servo tracks into one or more data tracks of the tape, the one or more embedded servo tracks comprising servo positioning information, wherein the plurality of data tracks and the one or more embedded servo tracks have a same length, and wherein the one or more embedded servo fields are erasable and re-writeable, and a plurality of read heads configured to read the user data and the embedded servo fields from the tape.

In yet another embodiment, a tape drive comprises a tape head assembly comprising: one or more servo heads configured to read servo data from one or more dedicated servo tracks of a tape, a plurality of write heads configured to: write user data to a plurality of data tracks of the tape and write embedded servo positioning information into one or more data fields of the plurality of data tracks of the tape, and a plurality of read heads configured to read the user data and the embedded servo positioning information from the tape. The tape drive further comprises a controller coupled to the tape head assembly, the controller configured to: dynamically tilt the tape head assembly based on the read embedded servo positioning information, and determine where to append new data to the plurality of data tracks based on the read embedded servo positioning information.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape drive including a tape head. The tape head comprises servo heads configured to read servo data from a tape, a plurality of write heads configured to: write user data to a plurality of data tracks of the tape and write embedded servo data into one or more data fields of the tape, the embedded servo data comprising servo positioning information, and a plurality of read heads configured to read the user data and the embedded servo data from the tape. The embedded servo data may be embedded servo fields or embedded servo tracks. The embedded servo data allows the tape head to be accurately controlled and positioned above the tape, and for new data to be accurately appended to the tape.

Figure 1A:
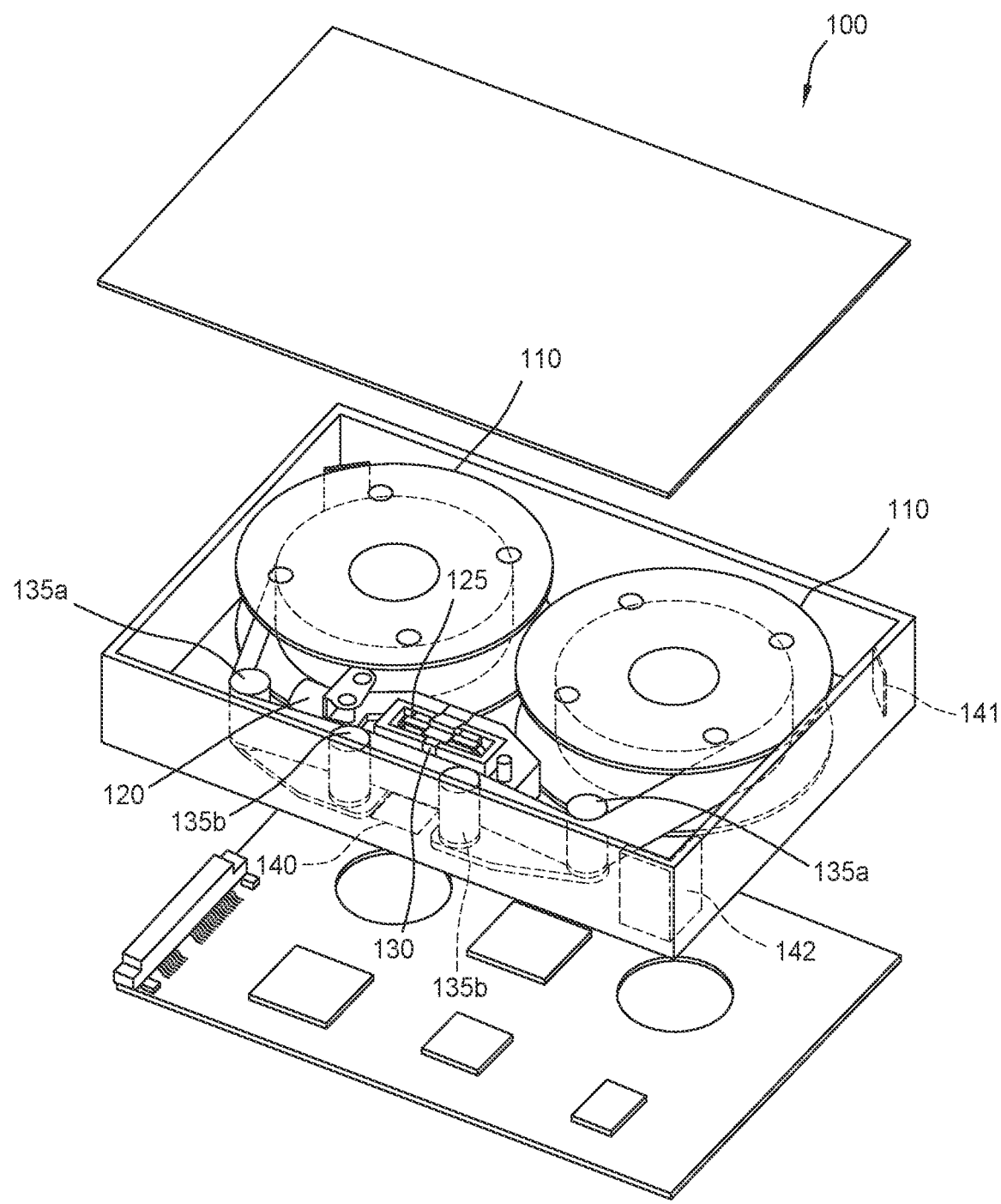
FIGS. 1A-1C illustrate a perspective exploded view, a simplified top down, and side profile view of a tape drive, in accordance with some embodiments.
Figure 1B:
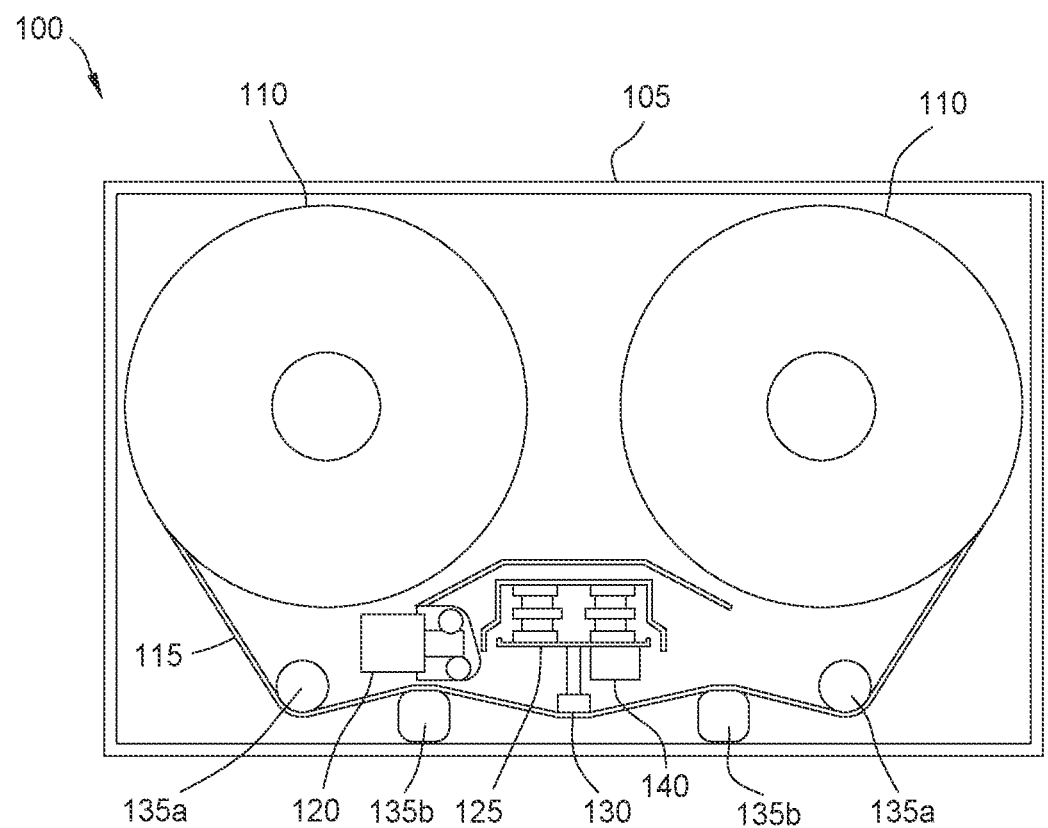
Figure 1C:
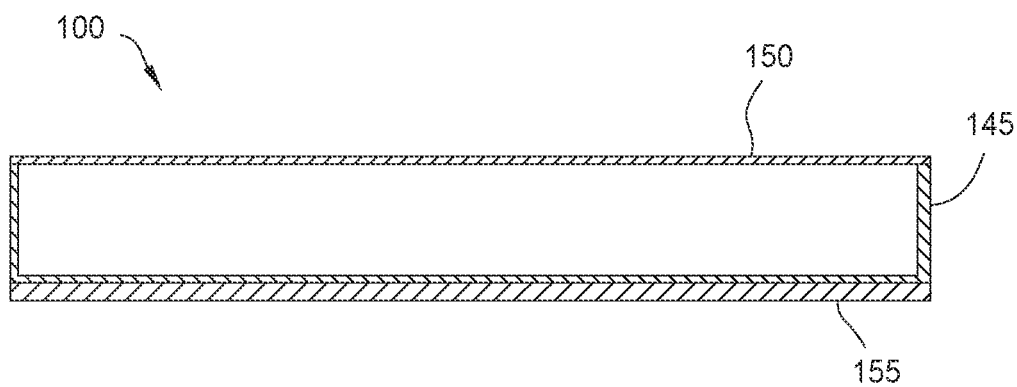

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.), a head assembly 130 with one or more read heads and one or more write heads, and tape guides/rollers 135a, 135b, and a controller 140 coupled to the head assembly 130. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100.

The tape media 115 comprises a base film, which can be PEN, PET, aramid or any similar plastic material, a magnetic recording layer on the front side of the tape media, and a back coat. The magnetic recording layer can be particulate in nature (e.g., barium ferrite or strontium ferrite particles, or metal particles), or fabricated using thin film sputtering techniques. The magnetic recording layer is the surface that can be magnetically manipulated (written to or read from) by one or more read/write heads. The back coat is applied to the reverse side of the base film to improve the mechanical characteristics of the tape media and aid in packing the tape 115 onto the tape reels and guide the tape 115 through the tape path components.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130. As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
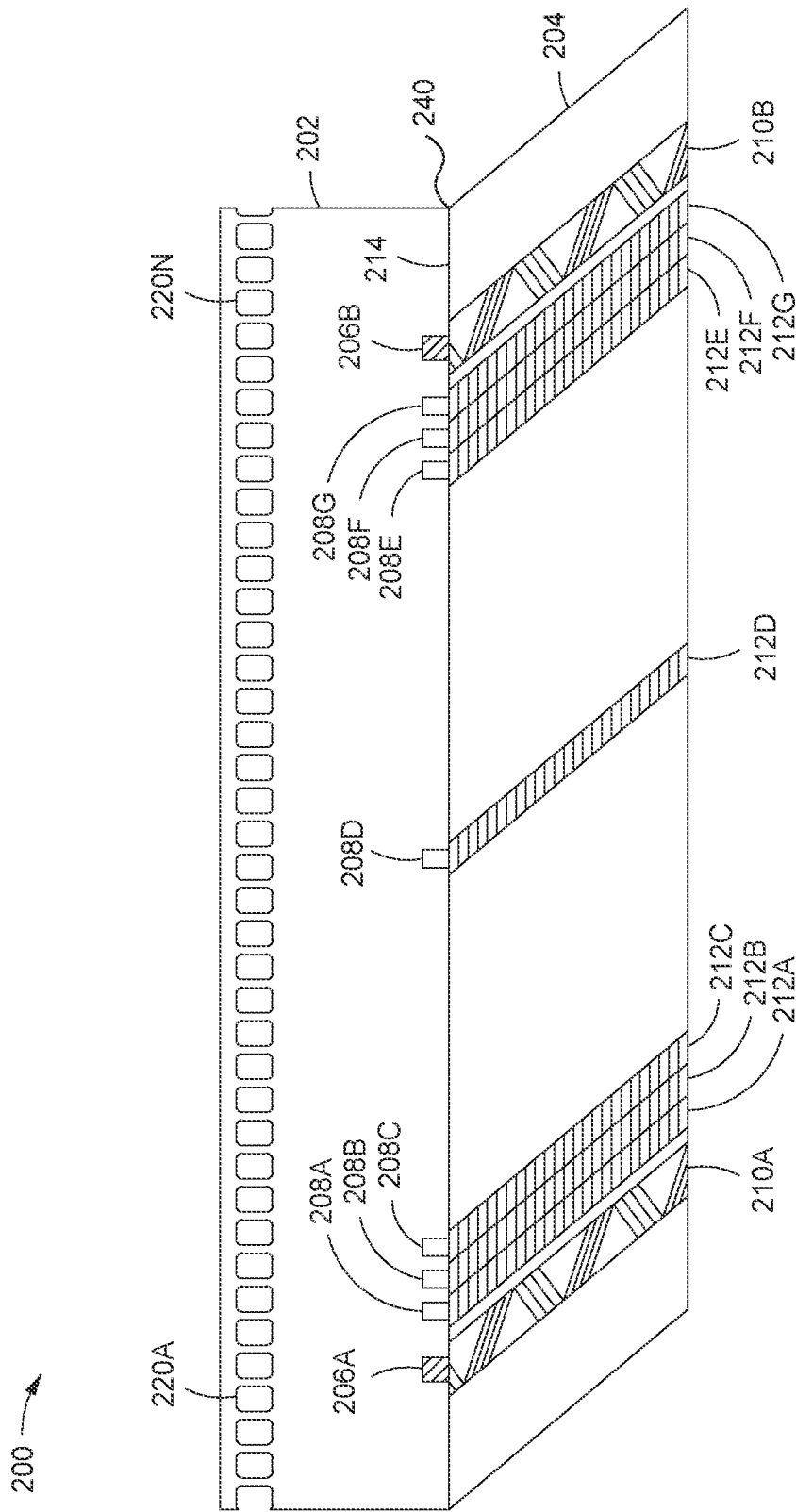
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller 240.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the electrical potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

FIGS. 3A-3E illustrate magnetic tapes 300, 350 comprising dedicated servo tracks 302a, 302b and a plurality of data tracks 304. Each of the magnetic tapes 300, 350 may be the tape 204 of FIG. 2, and may be utilized with a tape head module assembly, such as the tape head module assembly 200 of FIG. 2, or a tape drive, such as the tape drive 100 of FIG. 1. As such, aspects of FIG. 2 may be referred to in the description of FIGS. 3A-3E.

While not shown, a plurality of write heads of a tape assembly as configured to write user data and embedded servo fields from the tape, a plurality of read heads of the tape assembly are configured to read user data and embedded servo fields from the tape, and one or more servo heads of a tape head assembly are configured to read the dedicated servo tracks from the tape. The tape head assembly is coupled to a controller (not shown) of a tape drive (not shown).

Each tape 300, 350 comprises one or more dedicated servo tracks 302a, 302b. The dedicated servo tracks 302a, 302b may collectively be referred to herein as servo tracks 302. It is to be understood that while two servo tracks 302a, 302b are shown in each of FIGS. 3A-3E, the disclosure is not limited to two servo tracks 302. Rather, the number of servo tracks 302 can be more or less than two, depending on the requirements of the embodiment. Similarly, the number of data tracks 304 is not intended to be limiting, and a greater or fewer number of data tracks 304 than shown may be used.

Figure 3A:
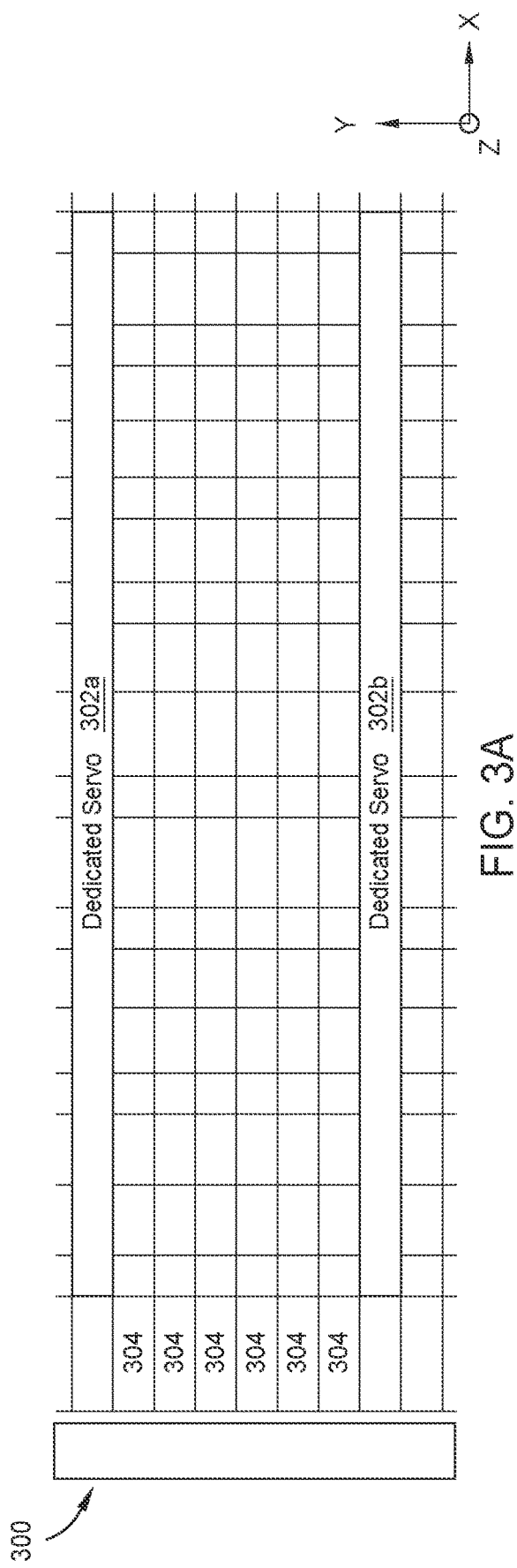
FIG. 3A illustrates a conventional magnetic tape comprising a first dedicated servo track, a second dedicated servo track, and a plurality of data tracks, according to one embodiment.

FIG. 3A illustrates a conventional magnetic tape 300 comprising a first dedicated servo track 302a, a second dedicated servo track 302b, and a plurality of data tracks 304, according to one embodiment. The first servo track 302a and the second servo track 302b are spaced apart in the y-direction by the plurality of data tracks 304 to allow a tape head 200 to monitor and control the average position of the data heads 208A-208G relative to the data tracks 304 on the tape 300. Positioning information for servo heads 206A, 206B to read is written to each servo track 302a, 302b once, at the media factory, at the beginning of the life of the tape 300. With conventional tapes 300, the servo information is written only the one time at the factory, and new servo information is not written at a later time.

Figure 3B:
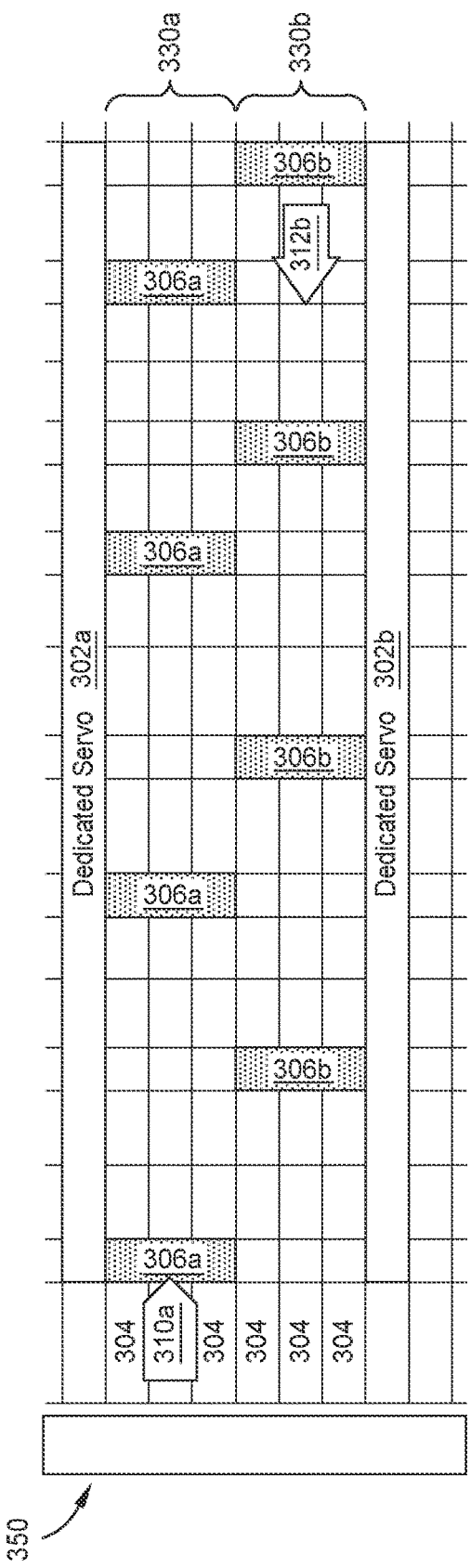
FIGS. 3B-3E illustrate a magnetic tape comprising embedded servo fields in addition to a first dedicated servo track, a dedicated second servo track, and a plurality of data tracks, according to one embodiment.

FIG. 3B illustrates a magnetic tape 350 comprising embedded servo fields 306a, 306b in addition to the first dedicated servo track 302a, the dedicated second servo track 302b, and the plurality of data tracks 304, according to one embodiment. The embedded servo fields 306a, 306b may be collectively referred to herein as embedded servo fields 306.

The embedded servo fields 306 comprise servo positioning information written into one or more data fields of the tape 350 when user data is being written to the tape 350. When the tape 350 moves in a first direction 310a (e.g., the x-direction), first embedded servo fields 306a are written to a first or upper portion 330a of the tape 350. When the tape 350 moves in a second direction 312b opposite the first direction 310a (e.g., the –x-direction), second embedded servo fields 306b are written to a second or lower portion 330b of the tape 350.

The embedded servo fields 306 may be written into one or more of data fields of the data channels or tracks 304 simultaneously as user data is being written to the data tracks 304. The embedded servo fields 306 are inserted periodically along the length of the tape 350. The embedded servo fields 306 may have a consistent or asymmetric distribution along the length of the tape 350. A controller of a tape head (not shown) may receive and analyze the positioning information read from the embedded servo fields 306.

The positioning information stored in the embedded servo fields 306 may include information of one or more parameters: servo busts, servo phase locked loop (PLL), environmental measurements, environmental sensor information, such as from temperature or humidity sensors, position error signals, workload or wear counters, tape tension, friction, and tilt angle, among others. The positioning information and various parameters written in the embedded servo fields 306 may be used to accurately append data to the data tracks 304.

With respect to measured servo bursts, upon read-back of the tape 350, the servo tracks 302 are used to locate the starting position targeted for read, as well as to maintain a position error signal (PES) and to compute a tape dimensional stability (TDS) offset by determining how the servo tracks 302 are spaced given any contraction or expansion. PES is the calculated error based from the dedicated servo tracks 302 and the recently read embedded servo fields 306. In addition to the positioning information stored in the servo tracks 302, the embedded servo fields 306 process interrupted measured embedded servo A-B-C-D bursts, help calculate a TDS offset, such as by comparing PES information from the dedicated servo tracks 302 to the embedded servo fields 306, and apply the TDS offset to the PES, which would in turn be applied to the VCM. The TDS offset compensation tracks TDS changes of both narrowing and widening in the Y-axis (narrow width) of the tape 350.

With respect to servo PLL, a known frequency PLL is added in the embedded servo fields 306 written to the data channels that can be measured and processed (i.e., servo PLL). The known frequency PLL enables channel frequency tuning, on a per channel basis. The servo PLL would provide information to calculate TDS information, such as whether the tape 350 was stretched (where the tape 350 would be read back at lower frequency) or compressed (where the tape 350 would be read back at higher frequency), and potentially adjust the data channel along the length (e.g., the x-direction).

With respect to environmental measurements, it is well known that humidity and temperature changes effect TDS of a tape 350 over time. Writing the embedded servo fields 306 including such environmental measurements at the time of write provides a path to characterize and calibrate TDS over the environmental changes. For example, if the tape 350 is written under hot and wet conditions, and a TDS characterization indicates the hot and wet writing conditions, the tape drive 100 may calibrate read-back or read-back error recoveries.

With respect to workload and wear counters, some areas of the tape 350 may have a different workload than others, such as in a banded or zoned tape format. Workload and wear are two attributes which affect TDS. Characterizing such workload and wear attributes in the embedded servo fields 306 enables the workload and wear attributes to be applied to read-back error recoveries.

The embedded servo fields 306 enhance positioning of the tape head 200 when used with the servo tracks 302. Because the embedded servo fields 306 are written when the tape 350 is written with user data, the embedded servo fields 306 contain reference data describing the state of the tape 350 at the time the data is written to the tape 350 in both the x- and y-directions of the tape 350, for example, any stretching and/or compression of both the length and width of the tape 350 which may have occurred while data was being written or read, or while the tape 350 was not in use (e.g., stored for a period of time).

For example, the dedicated servo tracks 302 may first be read-back to determine the expected conditions of the tape 350 and where the data is expected to be, and then the embedded servo fields 306 may be read-back to determine the actual conditions of the tape 350 and where the data actually is. By comparing the information read from the dedicated servo tracks 302 to the information read from the embedded servo fields 306, new data may be accurately appended to previously written data on the tape. Furthermore, the embedded servo fields 306 may be erased and re-written as user data is erased and re-written from the tape 350. For example, first TDS information may be written to the embedded servo fields 306 a first time. The embedded servo fields 306 may then be erased at some point, and second TDS information may be written to the embedded servo fields 306 at a second time. The first and second TDS information may be different based on the state of the tape 350 at the first time and at the second time. In other words, the second TDS information may be updated TDS information.

Figure 3C:
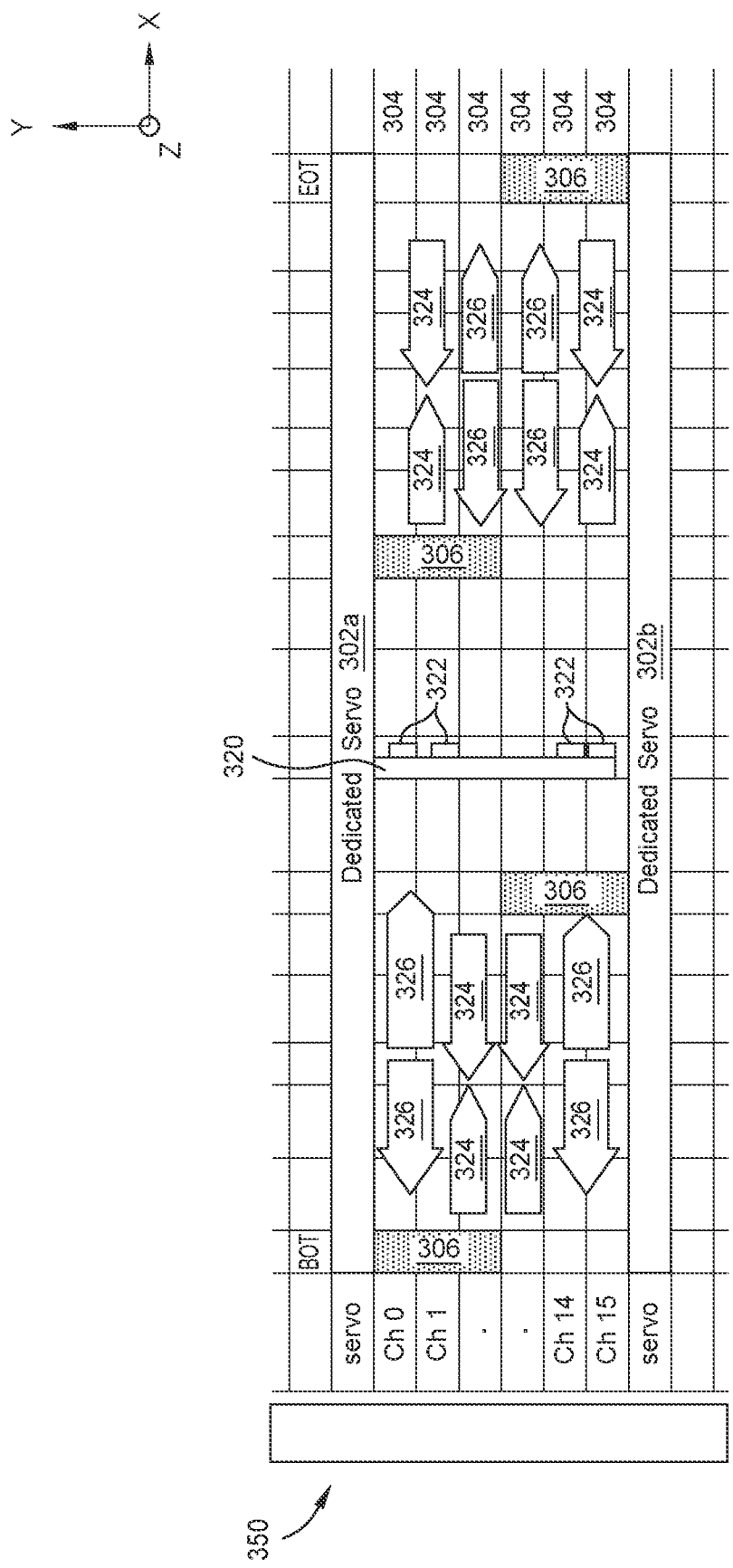
Figure 3D:
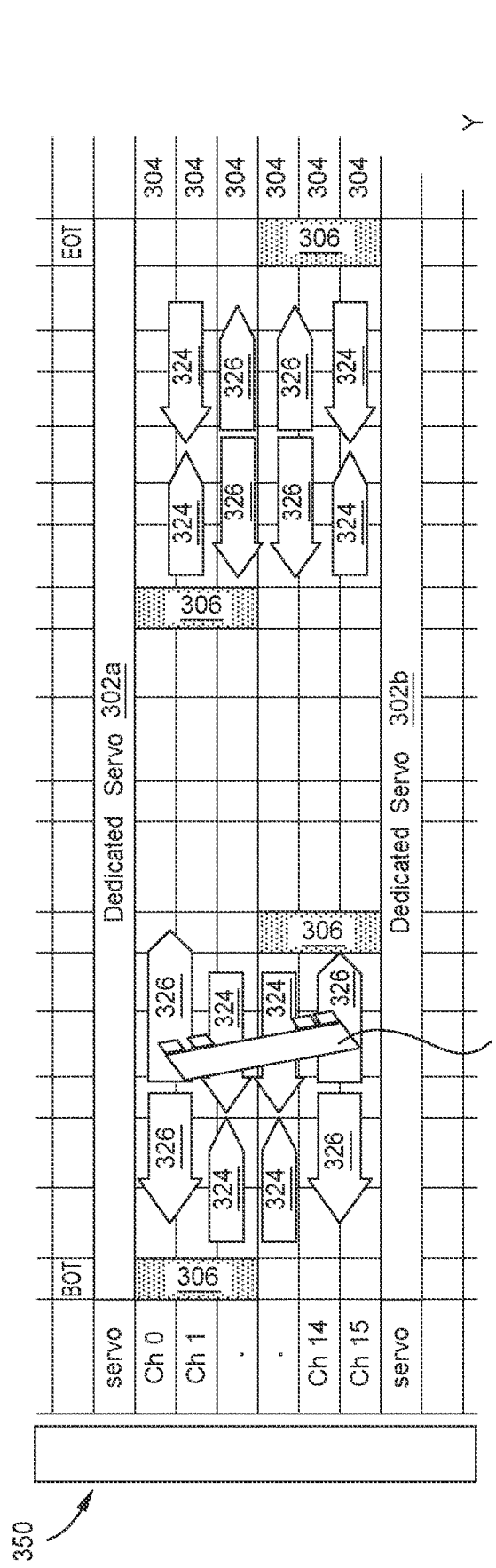
Figure 3E:
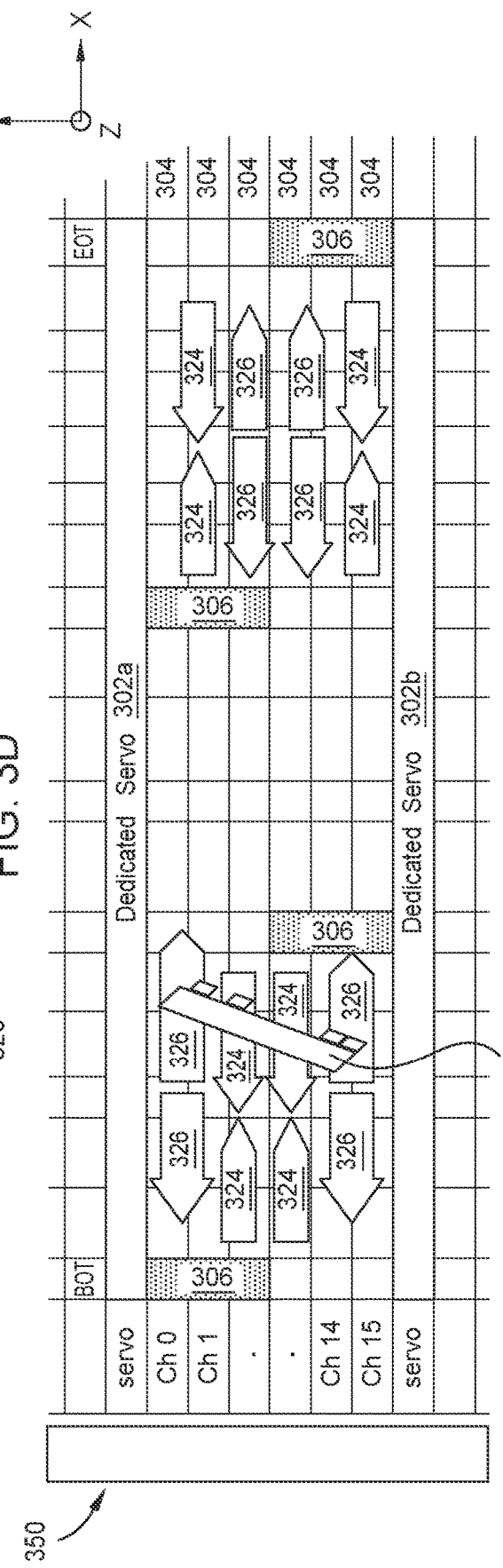

FIGS. 3C-3E illustrate exemplary embodiments of utilizing the embedded servo fields 306 to determine non-linear effects on the tracks per inch (TPI) of data written to a tape 350, according to various embodiments. A head assembly 320 comprises a plurality of read transducers 322 and a plurality of write transducers (not shown) is configured to read data from the tape 350. The head assembly 320 may be the tape head module assembly 200 of FIG. 2, and the read transducers 322 may be the data heads 208A-208G of FIG. 2. In each of FIGS. 3C-3E, the tape 350 comprises the dedicated servo tracks 302, a plurality of embedded servo fields 306, and a plurality of data tracks 304. While four embedded servo fields 306 are shown, any number of embedded servo fields 306 may be utilized, as described above. As such, the number of embedded servo fields 306 is not intended to be limiting. Similarly, the number of data tracks 304 shown is not intended to be limiting either.

When writing data and embedded servo information to the tape 350, the head assembly 320 was un-tilted (e.g., aligned with the y-axis), like shown in FIG. 3C. After a period of time, the tape 350 may be read and found to have changed or become deformed. For instance, the tape 350 is shown to be compressed in some areas (arrows 324) and expanded in other areas (arrows 326) due to various factors or parameters, such as environmental factors or workload and wear factors, for example. Towards the beginning of the tape 350 (BOT), the tape 350 is shown to be expanded 326 on the outer edges disposed closest to the servo tracks 302 and compressed 324 towards the center of the tape 350. Towards the end of the tape 350 (EOT), the tape 350 is shown to be compressed 324 on the outer edges disposed closest to the servo tracks 302 and expanded 326 towards the center of the tape 350. However, the compression and the expansion shown in FIGS. 3C-3E is for exemplary purposes only and is not intended to be limiting in any way. As such, the embedded servo fields 306 may be utilized with a tape 350 that is only compressed, only expanded, a combination of both compressed and expanded, or neither compressed nor expanded. Furthermore, the compression and the expansion shown in FIGS. 3C-3E is shown to be in the x-direction, but the tape 350 may also expand and/or compress in the y-direction and the −y-direction as well.

In order to read data from data tracks 304 that have been compressed or expanded, the head assembly 320 may need to be dynamically tilted by a controller (not shown) of a tape drive comprising the head assembly 320. By reading the embedded servo fields 306 upon discovering the state of the tape 350, an optimal tilt angle for the head assembly 320 can be determined to read the data from the data tracks 304. For example, the data may first be read back when the head assembly 320 is un-tilted. While some data may be readable, other data may not be. The embedded servo fields 306 may provide information regarding the state of the data on the tape 350, which would be used to find the optimal tilt angle for the head assembly 320 to be able to read all of the data.

As shown in the embodiment of FIG. 3D, the head assembly is tilted in a first direction, such as in the −xy-direction. Tilting the head assembly 320 in the first direction may enable additional data to be readable, such as the data written in the expanded portions 326 of the tape 350. As shown in the embodiment of FIG. 3E, the head assembly may be titled in a second direction different than the first direction, such as in the xy-direction. Tilting the head assembly 320 in the second direction may enable further data to be readable, such as the data written in the compressed portions 324 of the tape 350. Upon reading the data after tilting the head assembly 320, the various tilt angles of the head assembly 320 may be written in the embedded servo fields 306 when appending data to the tape 350.

The tilting of FIGS. 3D-3E in either direction from the y-direction has exactly the same effect, in that the longitudinal span between the outer data tracks 304 and embedded servo fields 306 (i.e., closer to the BOT or EOT) is reduced in a transverse direction. The titling in both directions isn't necessary, but rather, may be tilted like shown in either FIG. 3D or FIG. 3E. The data tracks 304 and embedded servo fields 306 would be initially written at some nominal tilt angle from the y-direction (thereby setting the span between the outer written data tracks 304 and embedded servo fields 306 on tape 350). If the tape 350 expands, then the data is read by decreasing the tilt angle relative to the writing angle. If the tape shrinks, then the head 320 is tilted further to line up the readers with the (now reduced pitch) of the written data tracks 304 and embedded servo fields 306. The tilt angle is thus only set to one angle when writing and then set to second angle (which is determined by the expansion or contraction of the tape 350) when reading.

Figure 4A:
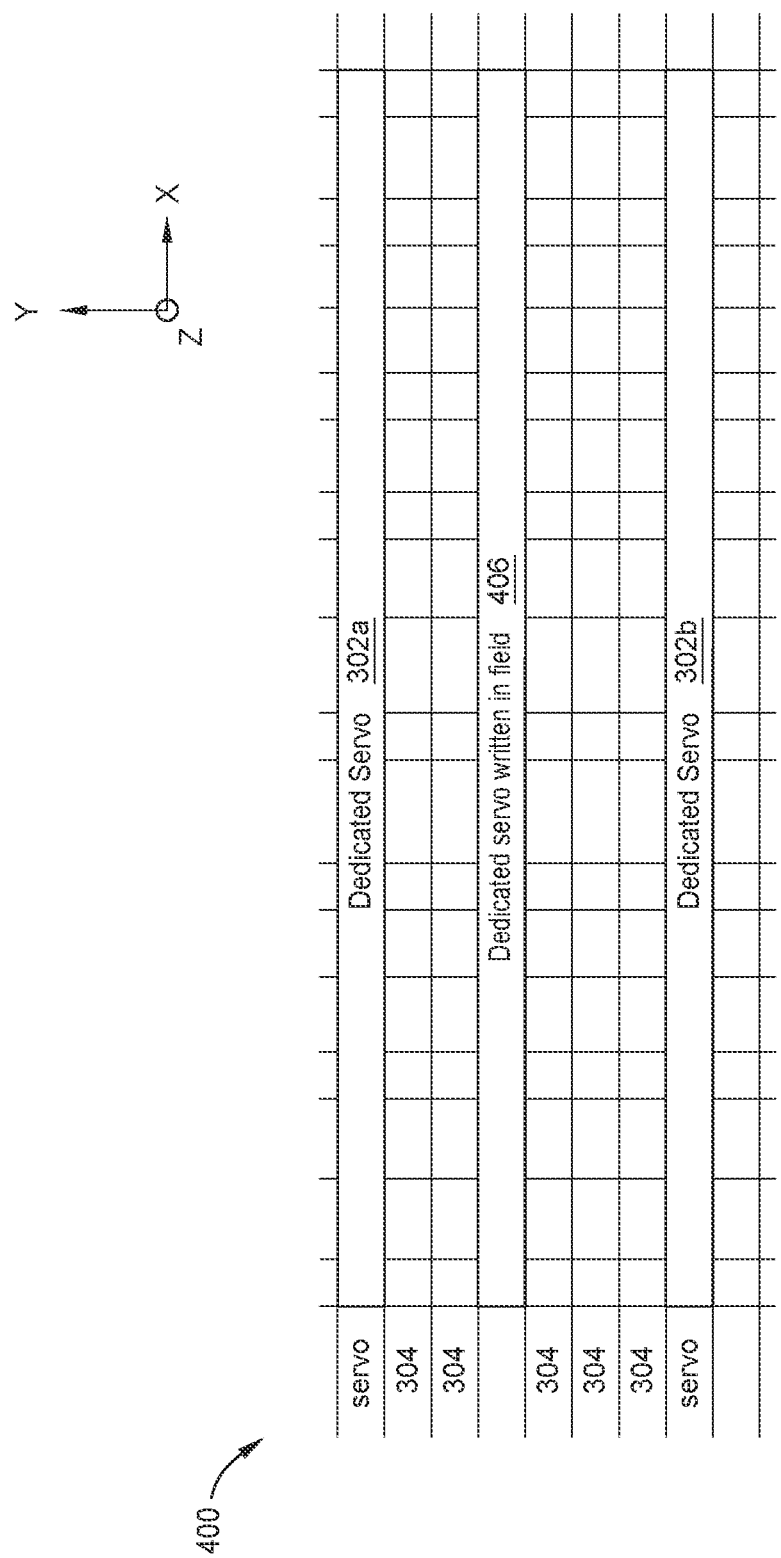
FIGS. 4A-4B illustrate magnetic tapes comprising dedicated servo tracks and a plurality of data tracks, according to various embodiments.
Figure 4B:
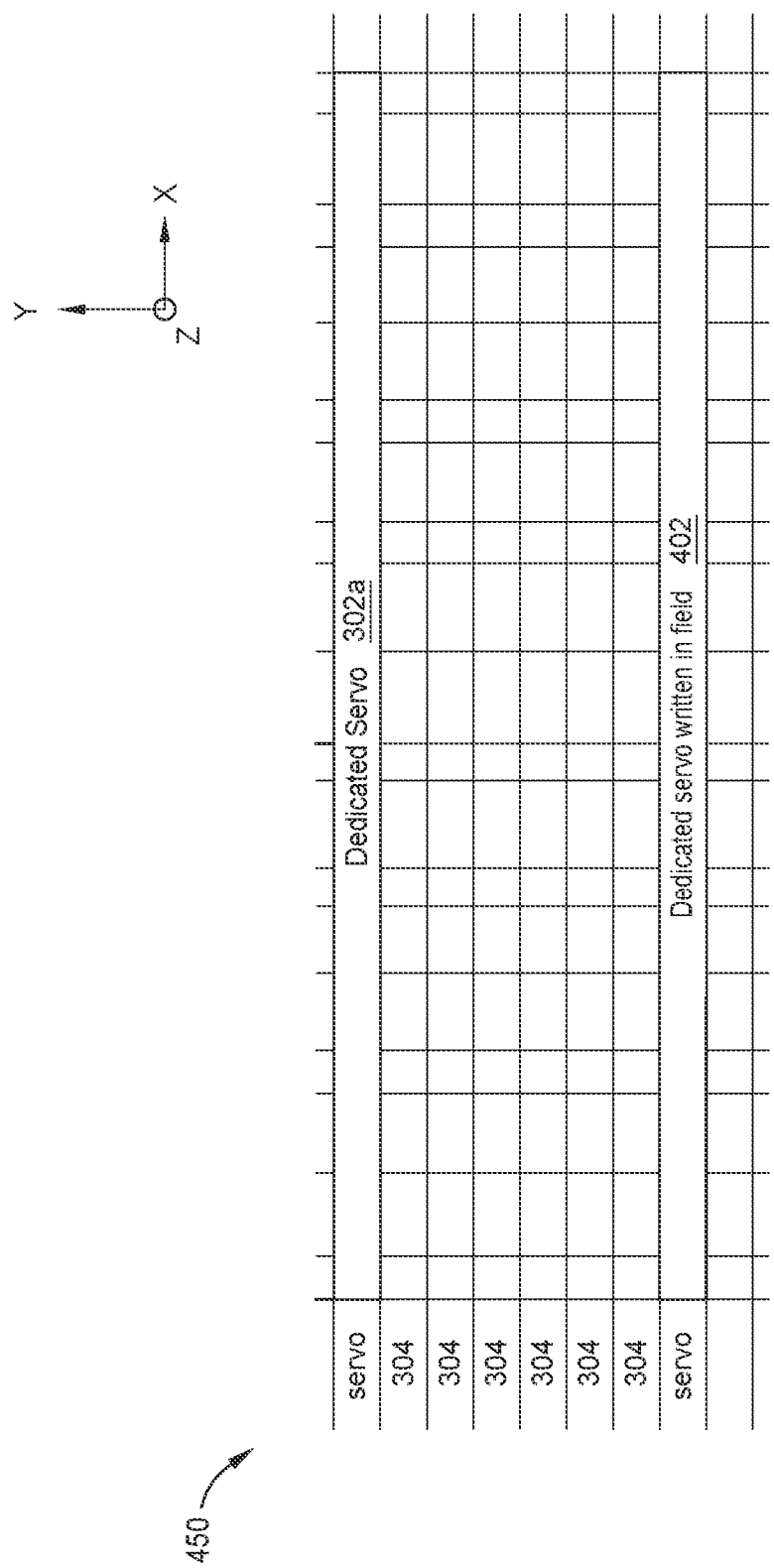

FIGS. 4A-4B illustrate magnetic tapes 400, 450 comprising dedicated servo tracks 302a, 302b and a plurality of data tracks 304. Each magnetic tape 400, 450 may be the tape 204 of FIG. 2, and may be utilized with a tape head module assembly, such as the tape head module assembly 200 of FIG. 2, or a tape drive, such as the tape drive 100 of FIG. 1. While not shown, a plurality of write heads of a tape assembly as configured to write user data and embedded servo fields from the tape, a plurality of read heads of the tape assembly are configured to read user data and embedded servo fields from the tape, and one or more servo heads of a tape head assembly are configured to read the dedicated servo tracks from the tape. The tape head assembly is coupled to a controller (not shown) of a tape drive (not shown).

The tape 400 is similar to the tape 350 of FIGS. 3B-3D; however the tape 400 comprises an embedded servo track 406, which is written at the same time the data tracks 304 are written, rather than the embedded servo fields 306. In some embodiments, the tape 400 may also comprise the one or more embedded servo fields 306 of FIGS. 3B-3D in addition to the embedded servo track 406. The embedded servo track 406 comprises servo positioning information written into one or more data tracks 304 of the tape 400 when user data is being written to the tape 400.

The tape 400 comprises one or more embedded servo tracks 406 reserved for updated servo positioning information that is written to the tape 400 as data is being written to the data tracks 304 of the tape 400. Since the one or more embedded servo tracks 406 are written into a data track 304, the plurality of data tracks 304 and the one or more embedded servo tracks 406 have a same length on the tape 400. The embedded servo tracks 406 may be written into one or more of the data channels or tracks 304 simultaneously as user data is being written to the data tracks 304. The embedded servo tracks 406 may be erased and re-written as user data is erased and re-written from the tape 400. Each subsequent re-write of the embedded servo track 406 will comprise updated TDS information or TDS effects on the tape 400, allowing for the updated TDS information to be compared to the dedicated servo tracks 302. A controller of a tape head (not shown) may receive and analyze the positioning information read from the embedded servo tracks 406.

The positioning information stored in the embedded servo track 406 may include information of one or more parameters: servo busts, servo phase locked loop (PLL), environmental measurements, workload or wear counters, tape tension, friction, and tilt angle, among others. The positioning information and various parameters written in the embedded servo track 406 may be used to accurately append data to the data tracks 304.

Similarly, the tape 450 is similar to the tape 350 of FIGS. 3B-3E; however the tape 450 comprises an updated servo track 402 rather than the embedded servo fields 306. In some embodiments, the tape 450 may also comprise the one or more embedded servo fields 306 of FIGS. 3B-3E in addition to the updated servo track 402. The updated servo track 402 comprises servo positioning information written into one or more of the dedicated servo tracks 302 of the tape 450 when user data is being written to the tape 450. As such, at least one or more dedicated servo tracks 302 may be reconfigured into the updated servo track 402, which is then re-written one or more times to include updated servo positioning information and parameters. The updated servo track 402 may be written into one or more of the dedicated servo tracks 302 simultaneously as user data is being written to the data tracks 304. The updated servo track 402 may be erased and re-written as user data is erased and re-written from the tape 400. A controller of a tape head (not shown) may receive and analyze the positioning information read from the updated servo track 402.

The positioning information stored in the updated servo track 402 may include information of one or more parameters: servo busts, servo phase locked loop (PLL), environmental measurements, workload or wear counters, tape tension, friction, and tilt angle, among others. The positioning information and various parameters written in the updated servo track 402 may be used to accurately append data to the data tracks 304.

By writing embedded servo information to a tape while writing user data to the tape, the tape head assembly can be controlled and positioned accurately, and new data can be appended accurately to the tape as well. The embedded servo information can be compared to dedicated servo tracks written to the tape at a factory level in order to determine whether the tape has changed or been deformed in any way and where data is actually located on a tape. Furthermore, various parameters and conditions of the tape can be easily determined by reading the embedded servo information, allowing for any corrections or tilting of the tape head assembly to be made dynamically as needed.

In one embodiment, a tape head assembly comprises one or more servo heads configured to read servo data from one or more dedicated servo tracks of a tape, a plurality of write heads configured to: write user data to a plurality of data tracks of the tape and write one or more embedded servo fields into one or more data fields of the plurality of data tracks of the tape, the one or more embedded servo fields comprising servo positioning information, and a plurality of read heads configured to read the user data and the embedded servo fields from the tape.

The positioning information stored in the one or more embedded servo fields comprises one or more parameters selected from the group consisting of: servo busts, environmental measurements, workload or wear counters, a tension of the tape, friction, and a tilt angle of the tape head. The one or more embedded servo fields are inserted periodically along a length of the tape. The one or more embedded servo fields have a consistent distribution along a length of the tape. The one or more embedded servo fields have an asymmetric distribution along a length of the tape. The plurality of read heads are configured to read the one or more embedded servo fields from the tape when appending data to the tape. The plurality of write heads are configured to write the one or more embedded servo fields simultaneously when writing user data to the tape. The one or more embedded servo fields are erasable and re-writeable. A tape drive comprises the tape head assembly and a controller configured to independently control each of the one or more servo heads, the plurality of write heads, and the plurality of read heads.

In another embodiment, a tape head assembly comprises one or more servo heads configured to read servo data from one or more dedicated servo tracks of a tape, a plurality of write heads configured to: write user data to a plurality of data tracks of the tape and write one or more embedded servo tracks into one or more data tracks of the tape, the one or more embedded servo tracks comprising servo positioning information, wherein the plurality of data tracks and the one or more embedded servo tracks have a same length, and wherein the one or more embedded servo fields are erasable and re-writeable, and a plurality of read heads configured to read the user data and the embedded servo fields from the tape.

The servo positioning information is used to determine a condition of the tape. Based on a condition of the tape, the servo positioning information is used to determine a tilt angle for the tape head assembly when reading the user data or appending new data to the tape. The plurality of write heads are configured to write the one or more embedded servo tracks when writing user data to the tape. The one or more embedded servo tracks can be re-written. A tape drive comprises the tape head assembly and a controller configured to independently control each of the one or more servo heads, the plurality of write heads, and the plurality of read heads.

In yet another embodiment, a tape drive comprises a tape head assembly comprising: one or more servo heads configured to read servo data from one or more dedicated servo tracks of a tape, a plurality of write heads configured to: write user data to a plurality of data tracks of the tape and write embedded servo positioning information into one or more data fields of the plurality of data tracks of the tape, and a plurality of read heads configured to read the user data and the embedded servo positioning information from the tape. The tape drive further comprises a controller coupled to the tape head assembly, the controller configured to: dynamically tilt the tape head assembly based on the read embedded servo positioning information, and determine where to append new data to the plurality of data tracks based on the read embedded servo positioning information.

The embedded servo positioning information is used to determine whether the tape has been expanded or compressed. The embedded servo positioning information comprises one or more parameters selected from the group consisting of: servo busts, environmental measurements, workload or wear counters, a tension of the tape, friction, and a tilt angle of the tape head. The embedded servo positioning information is written over a dedicated servo track of the tape when writing user data to the tape. The embedded servo positioning information is written to one or more data fields of one or more data tracks of the tape when writing user data to the tape. The embedded servo positioning information is compared to the dedicated servo tracks when dynamically tilting the tape head assembly and when determining where to append the new data.

While the foregoing is directed to embodiments of the present disclosure, other and further embodiments of the disclosure may be devised without departing from the basic scope thereof, and the scope thereof is determined by the claims that follow.

What is claimed is:
1. A tape head assembly, comprising:
one or more servo heads configured to read servo data from one or more dedicated servo tracks of a tape;
a plurality of write heads configured to:
write user data to a plurality of data tracks of the tape, and
write one or more embedded servo fields into one or more data fields of the plurality of data tracks of the tape, the one or more embedded servo fields comprising servo positioning information; and
a plurality of read heads configured to read the user data and the embedded servo fields from the tape.

2. The tape head assembly of claim 1, wherein the positioning information stored in the one or more embedded servo fields comprises one or more parameters selected from the group consisting of: servo busts, environmental measurements, position error signal, workload or wear counters, a tension of the tape, friction, and a tilt angle of the tape head assembly.

3. The tape head assembly of claim 1, wherein the one or more embedded servo fields are inserted periodically along a length of the tape.

4. The tape head assembly of claim 1, wherein the one or more embedded servo fields have a consistent distribution along a length of the tape.

5. The tape head assembly of claim 1, wherein the one or more embedded servo fields have an asymmetric distribution along a length of the tape.

6. The tape head assembly of claim 1, wherein the plurality of read heads are configured to read the one or more embedded servo fields from the tape when appending data to the tape.

7. The tape head assembly of claim 1, wherein the plurality of write heads are configured to write the one or more embedded servo fields simultaneously when writing user data to the tape, and wherein the one or more embedded servo fields are erasable and re-writeable.

8. A tape drive, comprising:
the tape head assembly of claim 1; and
a controller configured to independently control each of the one or more servo heads, the plurality of write heads, and the plurality of read heads.

9. A tape head assembly, comprising:
one or more servo heads configured to read servo data from one or more dedicated servo tracks of a tape;
a plurality of write heads configured to:
write user data to a plurality of data tracks of the tape, and
write one or more embedded servo tracks into one or more data tracks of the tape, the one or more embedded servo tracks comprising servo positioning information, wherein the plurality of data tracks and the one or more embedded servo tracks have a same length, and wherein the one or more embedded servo tracks are erasable and re-writeable; and
a plurality of read heads configured to read the user data and the embedded servo tracks from the tape.

10. The tape head assembly of claim 9, wherein the servo positioning information is used to determine a condition of the tape.

11. The tape head assembly of claim 10, wherein, based on a condition of the tape, the servo positioning information is used to determine a tilt angle for the tape head assembly when reading the user data or appending new data to the tape.

12. The tape head assembly of claim 9, wherein the plurality of write heads are configured to write the one or more embedded servo tracks when writing user data to the tape.

13. A tape drive, comprising:
the tape head assembly of claim 9; and
a controller configured to independently control each of the one or more servo heads, the plurality of write heads, and the plurality of read heads.

14. A tape drive, comprising:
a tape head assembly, comprising:
one or more servo heads configured to read servo data from one or more dedicated servo tracks of a tape;
a plurality of write heads configured to:
write user data to a plurality of data tracks of the tape, and
write embedded servo positioning information into one or more data fields of the plurality of data tracks of the tape; and
a plurality of read heads configured to read the user data and the embedded servo positioning information from the tape; and
a controller coupled to the tape head assembly, the controller configured to:
dynamically tilt the tape head assembly based on the read embedded servo positioning information; and
determine where to append new data to the plurality of data tracks based on the read embedded servo positioning information.

15. The tape drive of claim 14, wherein the embedded servo positioning information is used to determine whether the tape has been expanded or compressed.

16. The tape drive of claim 15, wherein the embedded servo positioning information comprises one or more parameters selected from the group consisting of: servo busts, environmental measurements, position error signal, workload or wear counters, a tension of the tape, friction, and a tilt angle of the tape head assembly.

17. The tape drive of claim 14, wherein the embedded servo positioning information is written over a dedicated servo track of the tape when writing user data to the tape.

18. The tape drive of claim 14, wherein the embedded servo positioning information is written to one or more data fields of one or more data tracks of the tape when writing user data to the tape.

19. The tape drive of claim 14, wherein the embedded servo positioning information is compared to the dedicated servo tracks when dynamically tilting the tape head assembly and when determining where to append the new data.

* * * * *